United States Patent [19]
Pollock et al.

[11] 3,779,731
[45] Dec. 18, 1973

[54] CONTROLLED GLASS MANUFACTURING PROCESS

[75] Inventors: E. Kears Pollock, Allison Park; Forrest K. Umbel, Verona, both of Pa.

[73] Assignee: PPG Industries, Inc., Pittsburgh, Pa.

[22] Filed: Feb. 7, 1972

[21] Appl. No.: 224,110

[52] U.S. Cl. ............ 65/29, 65/158, 65/161, 65/162, 65/163, 65/164
[51] Int. Cl. ............................................ C03b 5/24
[58] Field of Search ............. 65/335, 29, 158, 65/159, 160, 161, 162, 163, 164

[56] References Cited
UNITED STATES PATENTS
3,656,854  4/1972  Bricker et al. ............... 65/29 X
3,573,017  3/1971  Griem, Jr. ..................... 65/162 X
3,065,090  11/1962  Hopkins ........................ 65/335 UX
3,471,278  10/1969  Griem, Jr. ..................... 65/160 X OTHER PUBLICATIONS
November 20, 1972, Decision of the Supreme Court, Gottschalk vs. Benson, 169 USPQ 548.

Primary Examiner—Arthur D. Kellogg
Attorney—Russell A. Eberly

[57] ABSTRACT

Apparatus and a method for the control of a glass-making process are provided which minimize the occurrence of optical defects in the glass by the selective adjustment of some, but not all, of the control loops of the process responsive to a determination of which loops are critical.

5 Claims, 5 Drawing Figures

3,779,731

CONTROLLED GLASS MANUFACTURING PROCESS

BACKGROUND OF THE INVENTION

This invention relates to the manufacture of flat glass. More particularly, this invention relates to the minimization of optical defects in flat glass through the control of selected process parameters responsive to a defect diagnosis.

In the making of flat glass, batch materials comprising sand, soda ash, dolomite, rouge, carbon, limestone, cullet and other materials are portioned and mixed and are then charged to a melting furnace or tank. Heat is supplied to the furnace by the combustion of natural gas or oil or by electric heating elements. After melting and chemical reaction in a section of the glass furnace known as the melter, the molten glass passes through a section referred to as the refiner. In the refiner the molten glass is gradually cooled, and volatile products of reaction are degassed from the glass. Following refining, the molten glass is formed into a flat sheet of glass by one of several techniques; namely, a sheet drawing process, a plate rolling process or the float process. The end uses of flat glass, however formed, generally require good optical characteristics, but, due to a variety of circumstances, good optical quality is not easily obtained. A number of defects commonly encountered in flat glass have been classified and designated as follows:

The first family of defects, referred to as Type A defects, are microscopic surface defects. These defects are not localized, but are distributed over relatively wide areas of the glass surfaces and may be described and referred to as areal type defects and are most common to ground and polished plate glass.

The second family of defects, referred to as Type B defects, exist within the body of glass and result from inhomogeneity of the various ingredients in the glass and extend generally in the direction of the draw of the glass. These defects are strings, striae, and ream. When the inhomogeneities are oriented so that their length is aligned with the direction of glass draw and the planes of inhomogeneities are generally normal to planes of glass surfaces, the defect is called stria. When the inhomogeneities are aligned so that their major axes are oriented to extend in planes parallel to the glass surfaces, the defect is called ream. Strings are relatively thin, elongated, straight or gradually curled lines. While pure ream does not seriously affect the optical properties of a glass sheet viewed normal to its surface, ream does affect the optical quality of glass when viewed at a steep angle. Striae or any orientation of inhomogeneities containing a stria component of certain magnitude severely impairs the optical quality of flat glass no matter how viewed.

A third class of defects, referred to as Type C defects, are those of the point type, which may be within the glass, i.e., of the inclusion type, or may be present at the surface of the glass. Inclusion type defects include stones, boils, blisters and seeds. Stones are solid inclusions of refractory material that have failed to melt into the glass, or are formed as a consequence of glass manufacture. Boils and seeds are gaseous inclusions, seeds being on the order of one-tenth to one-half millimeter in diameter and boils being larger. Blisters are elongated boils, usually being a fraction of a millimeter wide and several millimeters long. Surface point type defects include sand holes, and bloach.

The fourth type of defects, generally referred to as Type D defects, are gross linear surface defects, broadly classified into scratches and sleeks.

Finally, a defect occurs which is characterized as distortion. It is related in appearance to Type B defects and is observable as apparent variations in the optical thickness of flat glass which results in the distortion of objects seen through the glass. These optical variations may be due to physical thickness variations or may be due to variations of index of refraction within the body of the glass. Distortion, characterized as having a long focal length (greater than about 0.5 inch), appears primarily related to thickness variations caused in forming the glass sheet. Ream or striae appear to be characterized by short focal length (less than 0.5 inch) distortion which is offensive when viewed at any angle.

Of all the defects encountered in making flat glass distortion, generally, and striae or ream, particularly, are the most difficult to control. This is because, while other defects appear caused according to relatively simple mechanisms, ream appears caused by a complex, and as yet not fully understood, mechanism involving variables throughout the process from raw material preparation to forming. Historically, the complexity of the mechanism has been demonstrated in commercial glass-making furnaces or tanks by the inability of experienced operators to ascertain the cause of striae or ream incidents or to determine with certainty what action causes the defect to disappear. Since no simple relationship exists between any controllable variable and striae or ream, it is unwise for an operator to respond to the onset of ream by immediately adjusting some variable. For, instead of correcting the problem, the added perturbation imposed upon the process may worsen the glass quality. On the other hand, an attempt to ignore the problem of ream in the hope that the process will stabilize itself may result in two to three days lost production before stability is regained.

It has therefore long been an objective to have a method for consistently responding to the incidence of striae or ream with speed, but with assurance that the cause assigned is correct so that changes in the wrong variable are prevented. A process control method which could consider numerous symptoms, evaluate them, and logically combine them into a most probable diagnosis of cause has been needed.

SUMMARY OF THE INVENTION

In brief, the method which has been developed senses objective and subjective process information, tests the optical quality of glass produced by the process against a minimum standard and, if the quality is inadequate, assigns a tentative weighting to each of several possible diagnoses. The method then proceeds with an iterative diagnostic method or procedure which takes each observation in turn, relating all to coincide with the time when the current glass passed that point in the process, and enhances the weight of each possible diagnosis according to the predetermined importance of each observation with respect to that diagnosis when considered in the absence of all other observations. When all valid observations have been utilized, a most probable diagnosis is determined in accordance with the final weightings. If the most probable diagnosis, when tested against a standard, has a low probability, responses from the process and operator for missing observations are demanded. When a most probable cause is assigned, a series of corrective control actions are provided to the process consistent with the probable cause of the defect. By this method, extraneous control actions are eliminated and adjustments are made only to process variables which will correct the immediate problem rather than introducing additional disturbance to the process.

For the purpose of discussing how the diagnostic method is performed, a detailed presentation of the apparatus necessary to provide signals to a computer will be eliminated here, though provided below.

For each of about 50 process observations, predetermined likelihood factors are assigned. These likelihood factors are the odds that a particular cause of straie or ream exists if the only element of information available is that single observation. These likelihood factors are preferably established by estimates made by persons familiar with the process. Though these same persons vary widely as to cause of striae or ream when confronted with all the observations simultaneously, it has been found that there is substantial agreement when the information is presented element-by-element. The average values for these expressed odds or likelihood factors are incorporated as numerical representations into a digital computer for use in the iterative diagnostic method. It has been discovered that by predetermining these odds or likelihood ratios consistently reliable diagnosis results.

The iterative method for combining observations from the process requires establishing a tentative diagnosis upon the determination that, according to the optical sensors, a defect exists. The tentative diagnosis made is that relative to each other all possible causes are equally likely but each is much more likely than the possibility that a mistaken measurement has been made, and, in fact, no defect exists. This is expressed and programmed into a digital computer as a series of cause probabilities or probability factors, each related directly to the probability of mistake, but only implicitly related to each other. These initial probability factors are initially set to arbitrary, but equal, values.

With each iteration, as additional observations are encountered, the prior probability factors are multiplied by their respective likelihood values to yield new probability factors. Finally, upon the assumption that a closed set of probable causes has been defined, the sum of all probability factors is normalized to unity, and the most probable cause is determined by an internal comparison.

If the terms used by the method are expressed algebraically, the steps of the method which are carried out by the computing element of the apparatus may be expressed as follows:

$L_{i,1}$ - Likelihood that observation (i) permits a conclusion that cause (1) is true;

$L_{i,2}$ - Likelihood that observation (i) permits a conclusion that cause (2) is true;

$L_{i,j}$ - Likelihood that observation (i) permits a conclusion that cause (j) is true;

(i) varies from $l$ to $n$ ($n \approx 50$);

$P_{B,j}$ - Probability before iteration that diagnosis (j) is true rather than mistaken existence of defect;

(j) varies from $l$ to $m$;

$P_{A,j}$ - Probability after iteration that diagnosis (j) is true rather than mistaken existence of defect;

(j) varies from $l$ to $m$ ($m << n$, generally 5 or less)

Upon the determination that the target defect incidence has been exceeded, the probabilities or probability factors are set at their tentative estimates:

$$P_{B,j} (j = l,m) = K$$

where K is an arbitrary constant.

The first observation is tested for validity and is valid the probabilities are adjusted.

$$P_{A,j} = (L_{l,j}) \times (P_{B,j}) \text{ etc. for all } j\text{'s.}$$

Then for each additional observation this iterative procedure is repeated.

$P_{B,j} = P_{A,j}$ $P_{A,j} = (L_{i,j}) \times (P_{B,j})$ etc. for all $j$'s.

When all observations are tested and the iterative procedure complete (i.e., when $i = n$), the sum of probabilities or probability factors is normalized to unity:

$$\sum_{j=1,m} P^o_{A,j} = 1.0 \qquad P^o_{A,j} = \left[ \frac{P_{A,j}}{\sum_{j=1,m} P_{A,j}} \right],$$

and normalized probability factors, $P^o_{A,j}$, are determined. If the largest normalized probability factor does not exceed an empirical standard of adequate assured control action, new observations are demanded by transmitting signals to the sensing elements of the apparatus and the full procedure repeated. When the most probable cause is sufficiently defined, a check is made of all control variables which are assigned to that cause of defect, and process control action is based upon these controls alone.

The present invention has particular utility in the manufacture of flat glass, but the control principles of this invention are applicable to other multi-parameter manufacturing processes as well. Continuous processes which may be controlled according to the principles of this invention include the making of iron and steel, the refining, cracking and reforming of petroleum fractions, the smelting and refining of non-ferrous metals, the generation of electric power, the making of paper, and other like processes.

Generally, in such multi-parameter processes the apparatus for carrying out the process and the material being processed may be characterized as a physical system. This physical system then is characterized by a plurality of conditions which have, from time to time, changing values. It has been known to control such physical systems by providing closed servo control loops having sensors to sense condition values and transmit such signals to controllers which in turn transmit control signals to actuators which manipulate or control some process condition value which affects the value of the condition being sensed. It has also been known to employ an external control unit which makes some adjustment to the closed servo loop controller responsive to some product or condition value (See U.S. Pat. No. 2,932,471 to Exner et al).

DESCRIPTION OF THE PREFERRED EMBODIMENTS

In the preferred embodiments, a flat glass manufacturing process utilizing a regenerative gas-fired furnace is controlled to minimize the intensity and extent of ream or striae in the ribbon of glass produced by the process.

Figure 1:
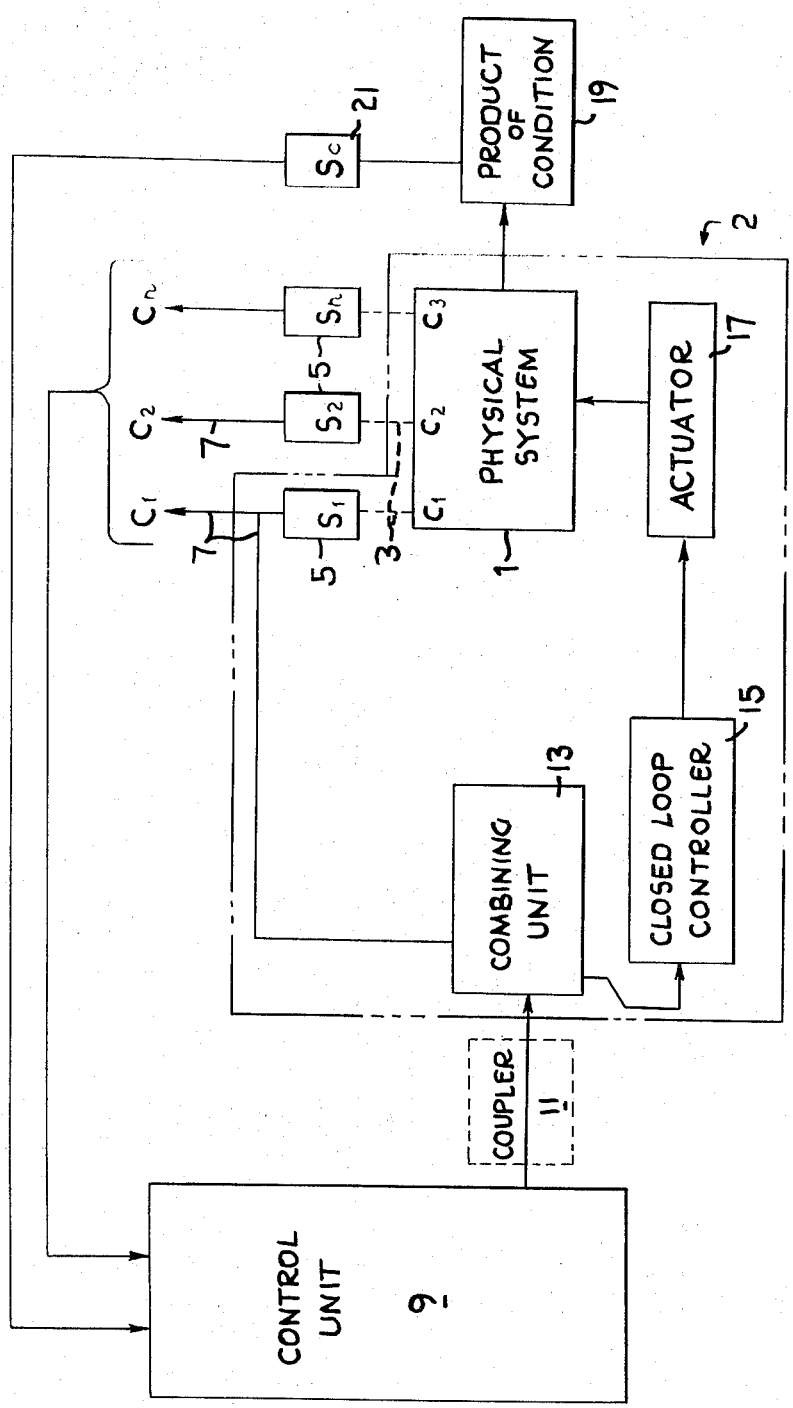
FIG. 1 is a block diagram schematically illustrating a generic embodiment of the control apparatus of this invention.
Figure 2:
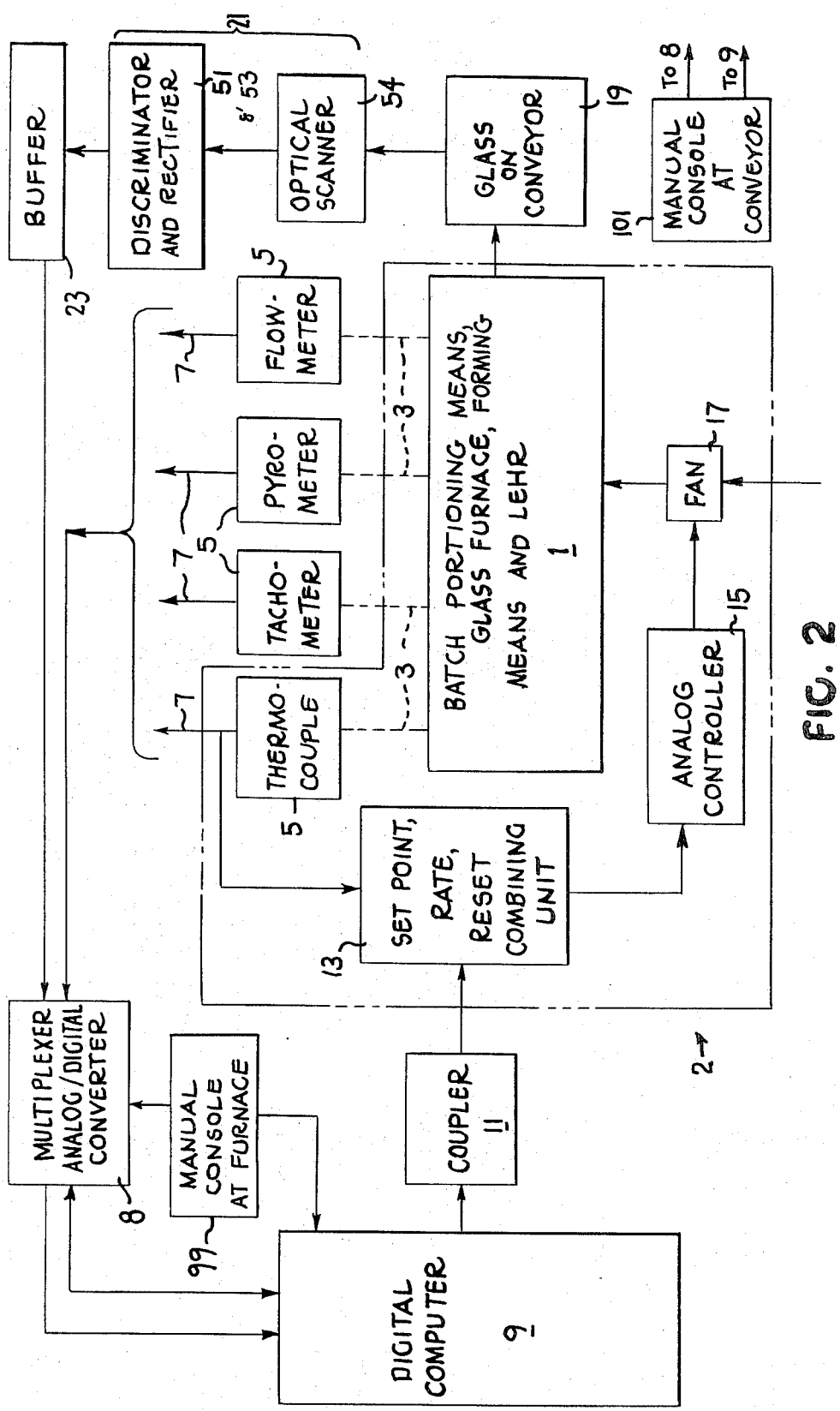
FIG. 2 is a block diagram schematically illustrating the preferred embodiment of the control apparatus of this invention adapted for the control of a flat glass manufacturing process to minimize optical defects in the glass manufactured.
Figure 3:
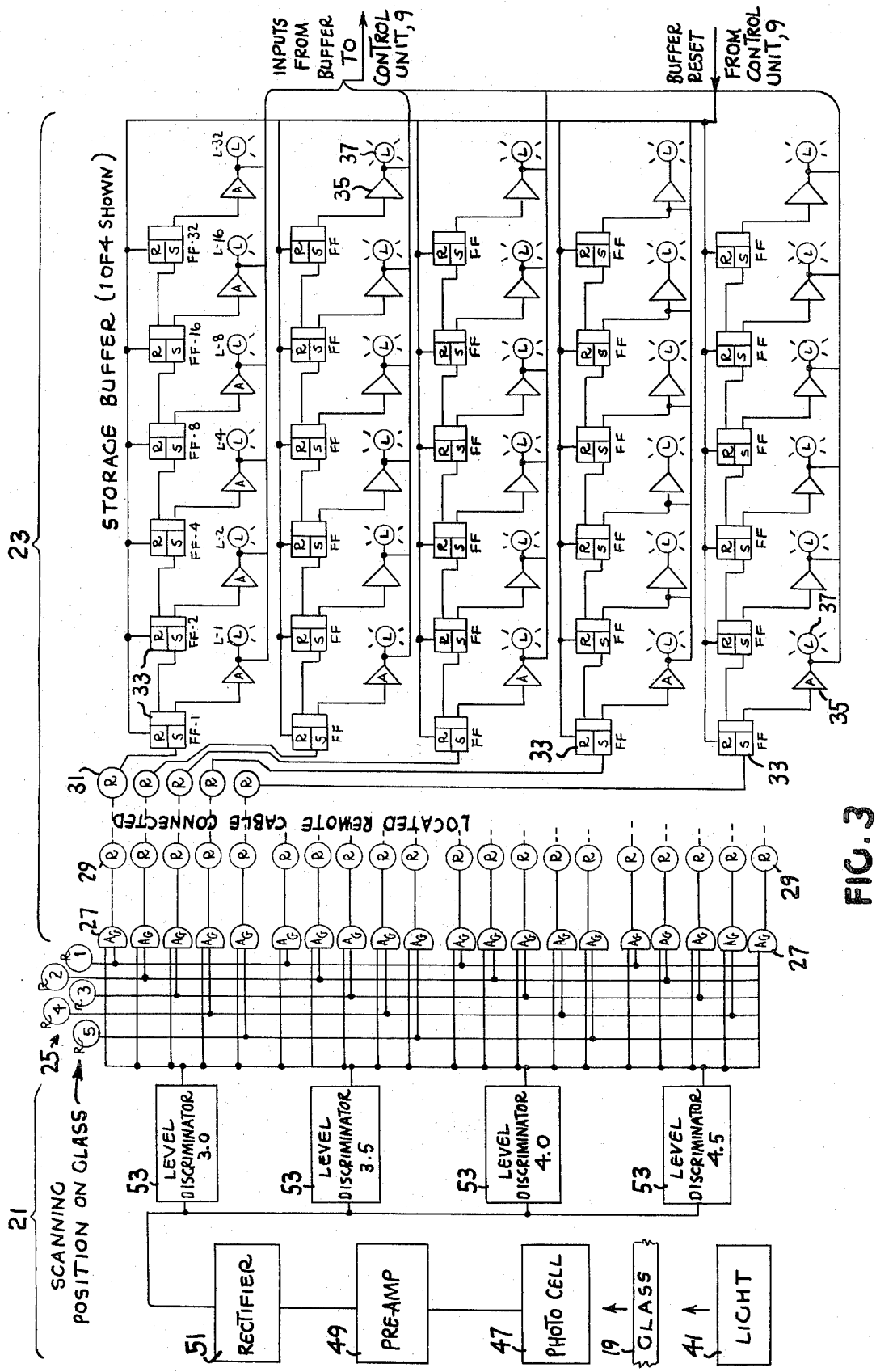
FIG. 3 is a circuit diagram illustrating a specific flip-flop buffer storage device to be incorporated in the preferred embodiment of FIG. 2 and to receive signals from the discriminator circuit of an optical defect detecting device of FIGS. 4 and 5.
Figure 4:
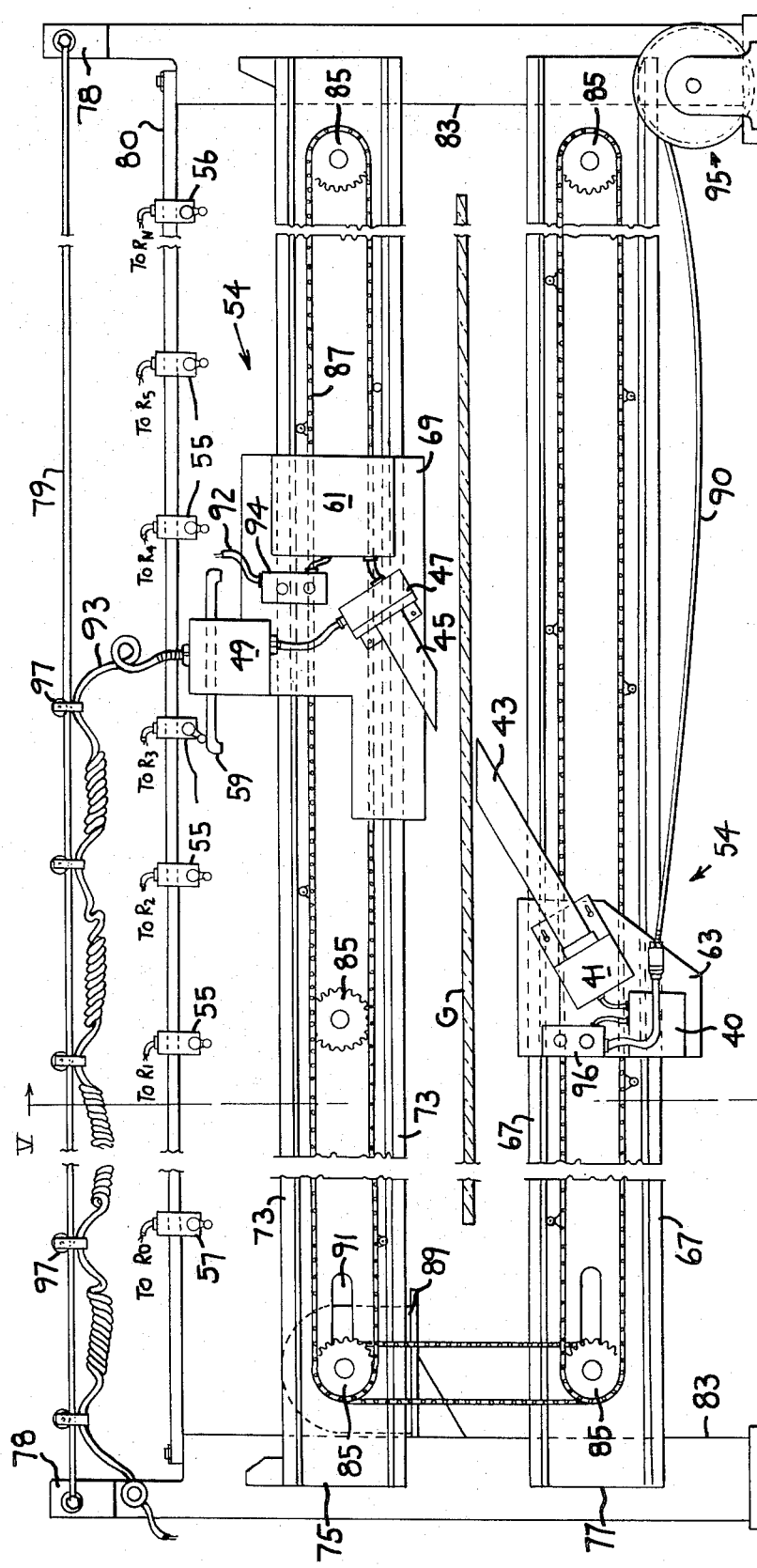
FIGS. 4 and 5 are schematic drawings of the optical defect detecting device and its traversing means as employed in this invention.
Figure 5:
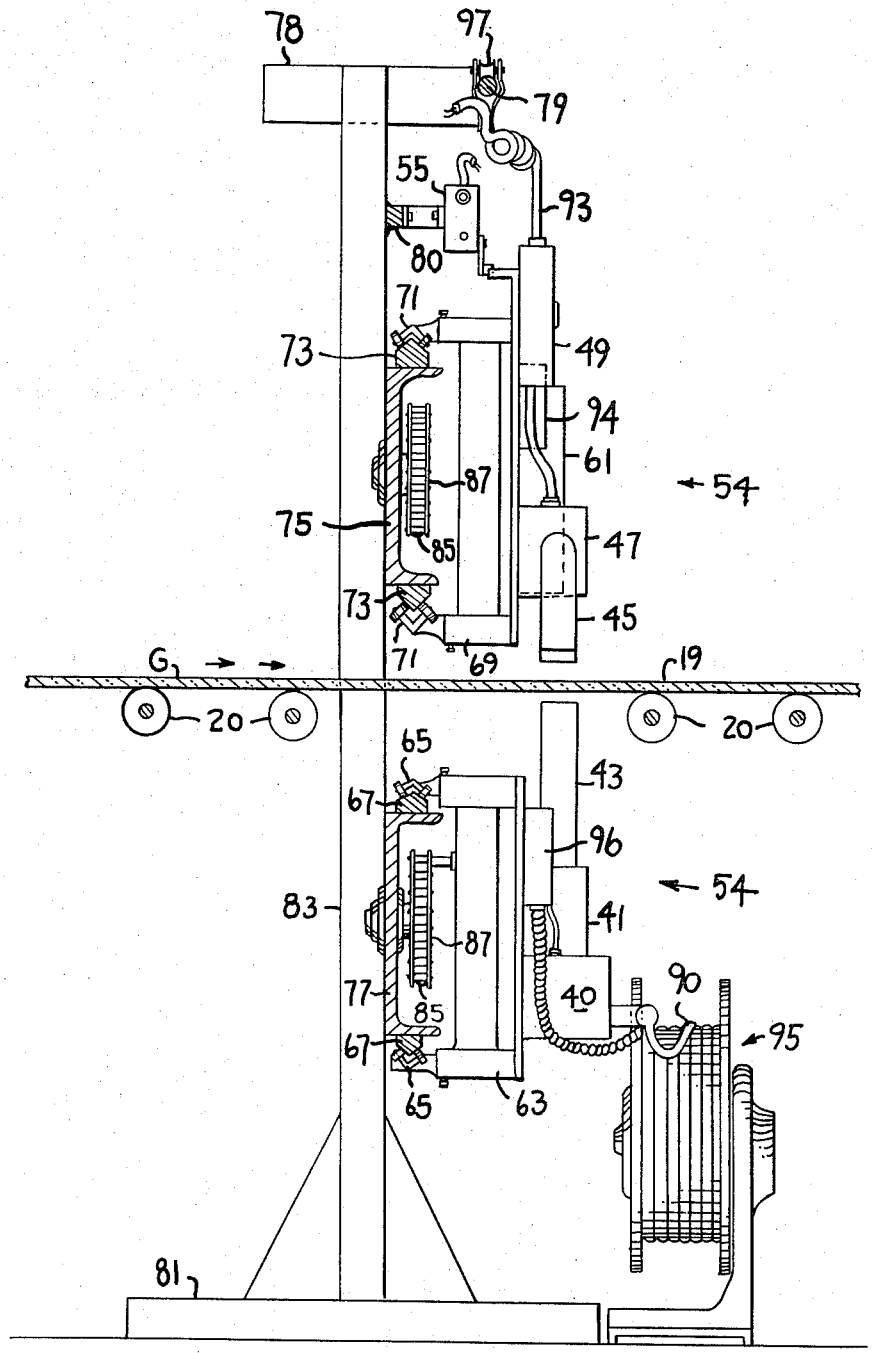

Referring to FIGS. 2 – 5, an optical defect-detecting device 21, for example, the device described in U.S. Pat. No. 3,199,401, is provided as a scanning and traversing means, 54, positioned along the path of the moving ribbon of glass, 19, so that the optical condition of the glass may be periodically detected. This defect-detecting traversing means, 54, is connected to discriminator and comparator circuitry, 23, where the signals from the detecting means are compared with pre-set signal levels corresponding to characteristic levels of defect intensity. Mechanical traversing means, 54, is provided to move the optical defect-detecting means across the glass. The optical defect-detecting means, 21, and its traversing means, 54, are provided with means for detecting the position, 25,55, of the optical detecting means in relation to the width of the moving glass ribbon, 19, for example, a plurality of limit switches, 55, which may be contacted with the traversing means, 54. Discriminator means, 53, is connected with a photocell, 47, for sensing defects through a pre-amplifier, 49, and a rectifier, 51, of the optical defect-detecting means, 21. The discriminator means, 53, and the position-detecting means, 25,55, are associated through AND-gates, 27, which control the input or signals to the buffer means, 23, shown in FIG. 3. Thus, signals from the discriminator means, 53, and signals from relays, 25, of the position detector means, 25,55, are combined to direct signals corresponding to individual defect intensity levels to a plurality of sets of digital components comprising a buffer circuit, again as shown in FIG. 3. The defect signal storage buffer means, 23, is connected to a data-computing means, 9, as will be described below.

A plurality of sensing means are connected to the glass manufacturing apparatus. At several conventional locations in the glass melting and refining furnace, thermocouples are placed in wells or holes drilled in the refractory members of the furnace at selected locations. Other thermocouples are placed in ceramic tubes which are immersed in the molten pool of glass within the furnace at selected locations. Still other thermocouples are positioned in conduits supplying air, fuel, gas and cooling air and water to the process. In general, thermocouples used to measure the temperature of refractory members of and the glass itself are platinum, platinum 10 percent rhodium thermocouples (Type R), and thermocouples for the measurement of lower temperatures, for example, gas, air and water temperatures are iron-constantin thermocouples.

Radiation pyrometers are located in the roof portion of the furnace at selected locations and are aimed toward the surface of the pool of molten glass and focused to measure glass surface and sub-surface temperatures in spot areas ranging in diameter from diameters of about 1 inch to about 1 foot. Radiation pyrometers (Type RGL) are preferably mounted in the furnace roof and provided with water cooling lines and air or inert gas purge lines directing a purge flow into the region about the pryometer lens.

Atmospheric pressure gauges are positioned at several selected locations within the melter portion and refiner portion of the glass furnace to detect the pressure within these spaces above the molten glass. These pressure sensing devices may comprise commonly available differential pressure (dp) cells comprising strain gauge circuitry. Exemplary of the pressure transducers employed are those of Statham Instruments, Inc., Los Angeles, PM-5-7C Models or equivalent. When the pressure differences to be measured are slight, the pressure may be measured by manometers with optical or conductivity transducers connected therewith to convert the indicated pressure to electrical signals suitable for transmission to the control unit of the present apparatus.

Flow meters are provided in various conventional forms. On fuel gas conduits supplying fuel to burners in the glass furnace melter, the flow meters comprise orifice plates and pressure gauges disposed across the orifice plate, as conventionally known, or other flow meters such, as are known in the art, may also be utilized. Air flow for combustion is also found to be conveniently measured using orifice meters. Bulk cooling air for the outside portion of the glass furnace may be advantageously detected by detecting the power supplied to cooling air fans positioned about the furnace, as for example, amp or watt meters on the motors of the fans, or when the cooling air is supplied through enclosed conduits, conventional flow meters, as for example, orifice plates and differential pressure (dp) cells may be employed.

A device is provided for determining the fuel quality and another for determining the extent of combustion in the furnace. Devices found useful for these purposes are Bailey Heat Provers with stack sampling accessories and calorimeters sold by Bailey Meter Co., Cleveland, Ohio.

Means for detecting the level of molten glass within the glass furnace is generally provided at only one location in the furnace. The level-detecting means may comprise a mechanical device, such as a float on a lever arm with an associated variable resistor and a constant voltage supply to indicate the position of the float and, thus, indirectly the level of the glass, or a nuclear radiation gauge, such as "Accuracy" device sold by Industrial Nucleonics, Columbus, Ohio, may be effectively employed. Means for sensing the throughput of the process, for example, a tachometer indicating the linear speed of the ribbon being drawn in the process, is provided along the glass ribbon conveyor. The tachometer may be any conventional device, as for example, a D. C. tachometer generator or a digital tachometer comprising known Zener diode circuitry. In order to fully define the throughput of the process, width and thickness measurements of the glass ribbon are also required. A thickness-detecting device may comprise a mechanical device, an optical device or a nuclear radiation device. A width-detecting apparatus typically will be a conventional optical or mechanical sensing device.

Weighing means for portioning batch materials to be charged to the glass tank are provided with sensing means which detect and transmit signals corresponding to the weight of each ingredient and to the weight of each total batch to the control unit of the apparatus. A clock is provided which detects the time of mixing batch ingredients. A flow meter and clock or timer are provided to detect the amount of water added to an individual batch of ingredients and means is provided for detecting the moisture content of each mixed batch as it passes from the portioning and mixing area to the hopper from which it is fed into the melting furnace. Since the moisture content of individual batch consituents may vary, it is necessary to control water addition to maintain a suitable moisture content in the mixed batch. A suitable moisture-detecting device is an infrared radiation sensitive device for detecting the amount of infrared energy reflected from the batch with the amount of water being proportional to the absorption of infrared energy. A clock (not shown) is provided with initiation and termination switch indicating means and is connected to the mechanical device which pushes batch materials from the feed hopper into the melting furnace. This permits detection of the frequency of pushes and the time delay between pushes, thus, indicating the feed rate of the materials into the glass melting furnace.

For certain process parameters conditions are more easily detected visually than by known transducers. Thus, manual input stations, 99 and 101, are provided for the insertion of visually detected data into the control device. The following observations may be made visually and numerically coded; a simple integer code is effectively used: distance from furnace feeding end to which floating batch material extends; orientation of floating batch material, whether directed to the left or right or symmetric; distance from furnace feeding end to which a foamy glass surface extends; the extent to which a dark floating flux is apparent on the melted glass surface in the melting zone of the furnace; the orientation of flames with respect to the glass surface; and the like.

Cooling in the refining zone of the glass furnace may be supplied by paired single pass pipe coolers inserted from opposite sides of the furnace. The amount of cooling may be controlled by the extent of cooler insertion with the cooling water flow maintained constant through the coolers. The depth of insertion may be sensed by a voltage divider or a series of spaced limit switches indicating position. Pipe coolers may be provided above the surface of molten glass for cooling by surface radiation or may be immersed in the molten glass for conductive heat removal.

Individual sensors included within those described above are, in general, elements of individual closed servo control loops. Although these closed loops are generally analog servo loops, they may be partially digital servo loops. As will be fully appreciated by those skilled in the arts of process control and computing machinery, the control unit, coupler, combining unit and closed loop controller may all be combinations of elements within a single digital computer properly programmed and having appropriate circuitry. And it will be apparent that analog computing devices may be substituted for the preferred digital devices.

In the instance of analog control loops, 2, the loops typically comprise a sensor, 5, having its output, 7, connected to a controller, 15, and the controller, 15, having its output connected to an actuator, 17. Specifically, illustrating a typical loop by example, a thermocouple, 5, may have its output connected to an analog temperature controller, 15, in which the signal emanating from the thermocouple is compared with a standard voltage, and the error, or the differential between the signal and the standard, is used to modify an output signal from the controller to an actuator, 17, such as a valve motor, controlling fuel to a burner, which will increase the level of combustion upon a detection of decreased temperature. Alternatively, the thermocouple may have its analog signal converted to a digital signal by a device such as, for example, a digital voltmeter, 8. This digital signal is fed to a digital computer, 9, which compares the digital representation of the temperature with a fixed temperature representation, noting the error between them, and, in accordance with a preprogrammed relationship, a digital output signal is provided responsive to this error to a device, such as a stepping motor, which completes the circuit and controls the valve position The closed servo loops, whether analog or partially digital, comprising a part of the present method and apparatus are, in and of themselves, well known in the practice of process control.

Exemplary of the servo control loops which are encompassed within the overall control function of this invention are those listed below. The function of each loop is defined along with the process parameter, 3, sensed, the means of sensing and the actuator for controlling the process condition associated with the loop. For each loop a class of defect causes is identified, and it will be understood that loop control of a particular loop will be altered according to this invention responsive to that class of causes determined most critical.

TABLE I.—CONTROL LOOPS

| Loop function to control | Number of loops | Sensor (5) | Actuator (17) | Class of defect cause |
|---|---|---|---|---|
| 1. Ingredient weight | 10-25 | Photo cell or limit switch on scale | Gate feeding scale | Batch. |
| 2. Total batch weight | 1-2 | Photo cell or limit switch on scale | Gate directing scale discharge | Do. |
| 3. Moisture in batch | 1 | Infrared analyzer | Flow controller or timer for mixer | Do. |
| 4. Cullet ratio | 1 | Photo cell or limit switch on scale | Gate feeding scale | Do. |
| 5. Carbon content | 1 | Visual appearance of melt | Set point on scale | Do. |
| 6. Iron content | 1 | 2-6 thermocouples on tank bottom | Do. | Do. |
| 7. Flux content | 1 | Visual appearance of melt | Do. | Do. |
| 8. Position of unmelted batch | 2 | Visual determination of position or scanning radiation pyrometer. | Set point on total fuel flow and cullet ratio set point. | Thermal and batch. |
| 9. Firing in melter | 6-12 | 6-12 crown or roof thermocouples and flow meters. | Flow controllers on fuel lines | Thermal. |

TABLE I.—CONTROL LOOPS—Continued

| Loop function to control | Number of loops | Sensor (5) | Actuator (17) | Class of defect cause |
|---|---|---|---|---|
| 10. Unmelted batch orientation | 2-4 | Sidewall thermocouples and visual | Timer on firing reversal cycle | Do. |
| 11. Reduction/oxidation | 1-2 | Stack gas analyzer flow meter | Flow controller on fuel air lines | Do. |
| 12. Furnace pressure | 2-4 | Pressure transducers | Stack dampers | Do. |
| 13. Circulation at exit of melter | 2 | Side thermocouples and radiation pyrometer with voltage divider on coolers. | Motor controller on 1st cooler | Do. |
| 14. Temperature of glass for refining | 2-4 | Radiation pyrometers, side thermocouples immersed in glass and voltage divider on coolers. | Motor controller on 2d cooler | Do. |
| 15. Temperature of glass for refining | 2-4 | Radiation pyrometers, roof thermocouples. | Flow controller on cooling air into furnace. | Do. |
| 16. Circulation of glass in refiner | 2-4 | Bottom thermocouples, amp or wattmeters on bottom cooling fans. | Flow controller on cooling air or power control on fans. | Do. |
| 17. Level of glass | 1 | Nuclear radiation gauge | Timer on batch pushing motor | Refractory. |
| 18. Refractory reaction | 1-2 | Roof thermocouples | Flow controller fuel and cooling air of flame directed at refractory. | Do. |
| 19. Refractory reaction | 1-2 | Wall thermocouples | Flow controller for cooling air into refractory structure. | Do. |
| 20. Refiner exit temperature | 1 | Immersed thermocouple | Flow controller for cooling air into tuille area. | Thermal. |
| 21. Speed | 1-2 | Tachometer | Drive motors | |

While other control loops may also be found useful, the loops described in Table I are adequate for the control of flat glass melting and refining to provide good quality molten glass to any forming operation including plate, float, sheet and downward drawing. In accordance with this invention the loops are classified according to a particular type of defect cause so that upon determination that a particular cause is most probable only loops within that class are disturbed, thereby minimizing the likelihood of further perturbation of the process with consequent instability.

The output signal leads of the sensors described above, both those which are sensors associated with individual closed servo loops and those which are not, are connected to the control unit or digital computer, 9, of the present apparatus. The analog signlas, 9, from the several sensors may be conditioned in various conventional ways for transmission to and entry into a digital computer. A convenient method for conditioning the signals and controlling their transmission to a digital computer, 9, particularly where a digital computer is located remotely from the sensors, is to provide a sensitive switching device or multiplexer, 8, to switch among the various sensors under control from the digital computer, 9, and to connect the output of such a multiplexer to an analog-to-digital converter, such as an integrating digital voltmeter, 8. The integrating digital voltmeter, 8, is then connected to the digital input circuitry of the digital computer, 9, employed. A multiplexer and integrating digital voltmeter combination which has been successfully tested has been that of Vidar Corporation, Mountainside, Calif., in particular a multiplexer, voltmeter, coupler combination designated 5202-652-50. A digital computer, 9, such as International Business Machines' (Armonk, New York) IBM 1802 is effectively employed in this invention.

The characteristic nature of the method and apparatus of this invention can best be understood from a detailed description of the method itself. In the manufacture of flat glass a substantial time elapses between the instant when the batch ingredients making up a particular element of glass are charged to the glass-making furnace and the instant when that element of glass passes as a part of a continuous glass ribbon from the annealing lehr to subsequent processing. It is important, therefore, in order to control the process in a stable fashion to adjust process parameters responsive to the optical condition of the glass after the annealing lehr in a manner which recognizes the fact that the value or condition of that process parameter at the same instant of real time as the detection of the optical defect is invalid and may tend to perturb the process and aggravate the condition at some later time. In the present system stable control is achieved by providing individual closed servo loops for the control and stabilization of individual portions of the glass-making process coupled with an overall control of the process being established in the set points and reset and rate conditions of individual loop controls conditioned upon the ultimate product quality.

Periodically, responsive to a clock incorporated in or coupled to a digital control unit, 9, of this invention, a signal is transmitted from that control unit, 9, to the integrating digital voltmeter and multiplexer, 8, which connect the individual process sensors to the control unit. According to a predetermined sequence, all or a portion of the process sensors are sampled by the multiplexer in each periodic sampling interval. A sampling interval of from 2 to 15 minutes is suitable. Analog signals from each individual sensor in sequence are switched through the multiplexer to the integrating digital voltmeter wherein the analog signal is converted to a representative digital signal and transmitted to the digital control unit. In accordance with the detected value for the speed of the glass ribbon being drawn from the process and with the predetermined distances of each sensor from one another, each value for each process parameter is placed in a set containing all process parameters, such that each set, when completed, represents the condition of the process as affecting a particular element of glass passing through the process.

During operation, the optical defect-detecting device, 21, continually scans the width of the moving glass ribbon, 19. As described in U.S. Pat. No. 3,199,401, the scanning device, 54, which carries the defect-detecting device, 21, comprising a light source carriage, 63, with railengaging rollers, 65, and carrying a light source, 41, connected to a power supply, 40, which in turn is connected through junction box, 96, to an A.C. source (not shown) by means of power cord, 90, wound on take up reel, 95, and comprising photocell carriage, 69, with railengaging roller, 71, and carrying a photocell, 47, and preamplifier, 49, connected to a D.C. power supply, 61, which in turn is connected through junction box, 94, to an A.C. source (not shown) by means of power cord, 92, which is supported by means (not shown) similar to the support for signal cord, 93, connected to the preamplifier, 49, is mounted on bridges, 75,77, across the ribbon, 19, and is supported on rails, 67,73, the scanning device, 54, being driven back and forth across the ribbon, 19, by drive-chains, 87, on sprocket wheels, 85, a motorized device, 91, mounted on support, 89. As the scanner, 54, tranverses the ribbon, 19, it contacts by means of contact bar, 59, individual limit switches, 55, mounted on support, 80, at predetermined locations spaced across the ribbon width.

As the defect-detecting device, 21, in the scanner, 54, traverses the glass ribbon, 19, the collimated light beam from light source, 41, of the scanner is interrupted by Type B defects in the glass, 19. Stray light is shielded from the unit by tubular light shields, 43 and 45. These elongated defects of ream or striae cause the light impinging on the photocell, 47, of the scanner detector, 21, to vary. The electrical signal in the photo tube, 47, of the scanner, of course, varies corresponding to the variation of light due to the optical defect. The signals are transmitted to preamplifier, 49, amplified and transmitted through signal cord, 93, to a remote rectifier, 51. The signal cord, 93, is mounted on rolling supports, 97, riding on rod, 79. Signals from the rectifier, 51, are compared with preset signals corresponding to particular levels of striae or ream which have been found to be important in the end use of the glass. From this comparison, which is accomplished by discriminators, 53, there are generated signals corresponding to individual defects encountered which exceed each of a plurality of defect intensities. Signals from each limit switch, 55, are transmitted to relays, 25, which provide signals according to scanner position which are compatible with these discriminator signals. The signal emanating from each discriminator level and the signals from each scanner position indicator or relay switch are directed in paired fashion to separate legs of a plurality of AND-gates, 27. Thus, the output of each AND-gate, 27, indicates a particular ream or striae intensity at a particular location within the ribbon. Associated with each AND-gate, 27, is a flip-flop storage buffer, 23. The ream position intensity signals from each AND-gate, 27, are transmitted, preferably by one shot relays, 29 and 31, if long cable lengths are necessary, to the first flip-flop, FF-1,33, in a serially connected group of flip-flops, 33, forming a storage buffer, 23.

Periodically, generally at the same interval as the sampling of other process parameters, 3, the condition of the flip-flops, 33, in the storage buffer, 23, are detected by the digital computer, 9, either through the multiplexer/analog-to-digital converter, 8, or directly. The condition of the flip-flops, 33, in the buffer, 23, of course, indicates the number of instances of encountering ream or striae of particular intensity in a particular region of the ribbon during the period between sampling. After detecting the condition of the flip-flops, 33, in the storage buffer, 23, all flip-flops, 33, are reset to their zero state by applying a pulsed voltage to each flip-flop reset leg simultaneously. The optical defect intensity and location signals from the flip-flops, 33, may be displayed by lights 37, each connected to a flip-flop through an amplifier 35. In effect, just as the computer 9 can detect the condition of the flip-flops, so can the lights 37 detect their condition. Display of the condition of or signals from the flip flops is provided by either the lights 37 or the computer 9.

For convenience in describing the preferred embodiment, the glass ribbon will be considered to be divided into five equally wide segments across its width, and the ream intensity to be detected for each of four intensities. It will be understood that more discrete intensities than four may be advantageously considered and that the width of the ribbon may be subdivided into a greater number of divisions of equal or unequal size depending upon the particular sensitivity to which the process is to be controlled.

For each of the five sections of the ribbon and each of the four intensities of ream or striae detected, the instances of defect, i.e., the number of defects encountered during a sampling period, is compared in the digital control unit with a predetermined standard, and, when the standard is exceeded, the following control sequence occurs.

When either the ream intensity or the trend of ream intensity, as determined by extrapolating the trend based on the current reading and a limited number of immediately preceding readings, exceeds a predetermined standard, the stored data set of process parameter conditions, 3, corresponding to the particular element of glass which is currently detected to have an optical defect is shifted from storage into an operating register. It is presumed that the optical defect which has been detected is due to one of three general causes or is a mistake. Thus, there exists a probability of one that the apparent defect is the result of (1.) a change in batch composition or (2.) a lack of thermal control in the tank or (3.) the dissolution of a refractory including the introduction of some extraneous refractory material into the melt or (4.) a mistake. The sum of the probabilities is therefore established as unity. For each class of cause and each of the process parameters, 3, or a selected combination of process parameters there is associated a likelihood that the observation of a particular condition or value, 6,7 for that process parameters permits a conclusion that one of the three particular causes of ream is true in contrast to the probability that the detected ream is due to an error in detection. These predetermined likelihood factors are separately stored within the digital computer, 9, and are shifted in response to the detection of ream from storage to an operating location or register therein.

Initially the probability that each of the three causes of ream is true is established at an arbitrary level, and it is found convenient to set each probability equal. In the sequence, each of the several process parameter condition values, 6,7, is compared with a predetermined condition or set point, and, responsive to this comparison, a likelihood factor corresponding to each of the three classes of ream cause is multiplied by the already established probability factor that such cause is true, such multiplying or combining yielding a new probability factor that that cause is true. By this iterative combining of likelihood factors and probabilities, a final probability factor that each of the causes is true is developed. The final probabilities are summed, and each of the probabilities individually is divided by such sum to provide a normalized probability factor that each of three causes of ream is true. The sum of these normalized probabilities is, of course, one.

This iterative combining of probability factors and likelihood factors may be illustrated as follows with the particular likelihood factors indicated herein being exemplary.

When ream or striae is found to occur at an intense level in each section of the glass ribbon, the likelihood factor that the ream is caused by a variation in batch composition is 1,000, the likelihood factor that a thermal cause exists to create the ream is 100 and the likelihood factor that ream or striae is caused by dissolution of some refractory material is 10. Thus, upon detecting this particular ream condition within the glass ribbon after a first iteration, the probability that the ream is due to a cause within the class described as batch causes is enhanced by a factor of 1000, the probability that because of the ream is in that class designated as thermal causes is enhanced by a factor of 100 and the probability at the ream is the result of a cause classed as a refractory cause is enhanced by a factor of only 10.

The ratio of combustion air and fuel gas is compared for the instant when the element of glass of interest was melted and for the period before and after this instant by periods of approximately 2 to 4 hours. When no statistically significant change is observed, the likelihood factors for each of the class of causes is one. When there is a significant change within such a time period, the likelihood factor that the ream was the result of some thermal cause is two (2) with the remaining likelihood factors one (1). Statistical significance is determined by conventional techniques using a 24 hour period as a preferred period for establishing means and standard deviations. Thus, after an iteration corresponding to a testing of the combustion air-fuel gas ratio the probability that the ream is caused by a thermal cause is enhanced by a factor of two (2) while the other probabilities remain unchanged when a signficant change in air or gas is detected. The folowing table illustrates exemplary likelihood factors for successive iterations, and it will be understood that for a particular glass-making process with a furnace of particular dimensions and sensors positioned at particular locations that likelihood factors having other values may be found to provide satisfactory performance when using the principles of the present invention. Throughout this discussion, terms such as "abnormal" and "significant deviation" or "change" mean statistically significant deviations using preferably a 24 hour base period and a ± two standard deviation control band, but preferably a ± one standard deviation band.

TABLE II

| Iteration | Process Parameters Condition Value | Likelihood Factors | | |
|---|---|---|---|---|
| | | Batch | Thermal | Refractory |
| 1 | Intense ream (4.0) detected all 5 sections of glass | $10^3$ | $10^2$ | 10 |
| 2 | Intense ream (4.0) one section only, not center | 10 | 20 | 50 |
| 3 | Intense ream (4.0) greater than 0.7 × (less intense ream (3.5)) | 10 | 2 | 20 |
| 4 | Intense ream (4.0) less than 0.7 × (less intense ream (3.5)) | 20 | 50 | 1 |
| 5 | Four hour trend of ream left and right of center divided by center ream monotonic | 50 | 10 | 2 |
| 6 | Section with most intense ream | | | |
| | Monotonic change 4 hours | 10 | 1 | 1.5 |
| | Monotonic change 6 hours | 20 | 1 | 2 |
| | Monotonic change 8 hours | 50 | 1 | 5 |
| 7 | Longitudinal position of unmelted batch in furnace more than ± 1/10 length from average (5 days) | 5 | 1 | 1 |
| 8 | Longitudinal position of foam in furnace | | | |
| | a. ½ to 1.5 firing ports downstream of target | 10 | 1 | 1 |
| | b. More than 1.5 firing ports downstream of target | 20 | 1 | 1 |
| 9 | Foam appears abnormal | 5 | 1 | 1 |
| 10 | Abnormal amount of dark "salt water" on surface | 5 | 2 | 1 |
| 11 | Change in cullet ratio in last 8 hours | 5 | 1 | 1 |
| 12 | Glass ribbon is bowed | 10 | 1 | 1 |
| 13 | Batch orientation not symmetric | 1 | 2 | 1 |
| 14 | Incomplete combustion indicated in stack gas | 1 | 10 | 1 |
| 15 | Flames touching: | | | |
| | a. glass | 1 | 5 | 1 |
| | b. roof | 1 | 1 | 5 |
| 16 | Depth of coolers into tank changed more than 1 foot in 4 hours | 1 | 20 | 1 |
| 17 | Pressure in furnace changed more than 0.2 inch in 4 hours | 1 | 5 | 1 |
| 18 | Ratio of combustion air and gas changed more than 0.5 percent in 4 hours | 1 | 2 | 1 |
| 19 | Bottom cooling air; | | | |
| | a. Low and unchanged | 1 | 1.5 | 1 |
| | b. Decreased in in 4 hours | | | |
| 20 | Peak melter roof temperature increased more than 15°F in 8 hours | 1 | 1 | 2 |
| 21 | Refiner roof temperature (upstream) more than 15°F high | 1 | 5 | 2 |
| 22 | Immersed thermocouples in refiner: | | | |
| | a. Monotonic change, 4 hours | 1 | 2 | 1 |
| | b. Monotonic change, 6 hours | 1 | 5 | 1 |
| 23 | Refiner exit glass temperature | | | |
| | a. Monotonic change, 4 hours | 1 | 2 | 1 |
| | b. Monotonic change, 6 hours | 1 | 5 | 1 |
| 24 | Refiner bottom temperature: | | | |
| | a. Increase 4 hours | 1 | 10 | 1 |
| | b. Monotonic change, 4 hours | 1 | 2 | 1 |

When the iterative combining of probabilities and likelihood factors is completed responsive to the particular condition values of the process parameters found in the set of values corresponding to the passage of the particular element of glass in which defects were encountered, the probability is compared with a preset standard. If the probability of a particular class of causes is greater than this preset standard, adjustment of selected control loops is dictated. If no explicit comparison is made it will be understood that an implicit comparison to a standard of zero has been made. The effect of this comparison is to damp the control provided by the present method, and the magnitude of the preset standard for comparison is directly proportional to the degree of damping desired.

In the testing of this control method with open loops it has been found that even when severe defect intensities are encountered defect causes can be accurately determined within one to two hours. Lengthy chemical and acid etch analysis according to the conventional Loeffler method confirm these determinations, but, as is well known, these confirming techniques require too much time for immediate use in controlling the process, thus heightening the importance of the present control technique.

Inasmuch as the adjustment of individual control loops according to this invention takes the form of adjustment of set points, rate of controller response and control bands, it is evident that the effect of this control is to tune the combination of loops to an optimum, as judged by glass quality, in the absence of deliberate changes in glass composition or throughput, including width and thickness adjustments.

This description is limited to specific embodiments to facilitate the understanding of this invention, and this description is not intended to limit the scope of the invention claimed. As will be apparent to those skilled in the art of process control, other processes will be amenable to control according to this invention, and, as will be apparent to those skilled in the art of glass manufacture, changes in furnace structure and control equipment will require the empirical determination of other process parameters and likelihood factors which will be encompassed within the scope of this invention.

We claim:

1. In the manufacture of flat glass comprising portioning, mixing and charging batch materials to a melting furnace; melting said batch materials to form molten glass; refining said molten glass; forming and cooling said molten glass to produce a continuous ribbon of glass; wherein a plurality of servo loops are controlled to control said manufacture of flat glass; the control of each servo loop comprising detecting the value of an individual process parameter to be controlled, comparing the detected value of said process parameter with a standard, responsive to said comparison generating a control signal and responsive to said control signal controlling said process parameter by controlling an actuator acting upon it; said process parameters comprising at least two parameters including batch weight, batch ingredient weights, batch moisture, cullet ratio, glass melter temperature, molten glass level, glass refiner temperature and the like; the improvement comprising:

a. establishing for each of said process parameters a plurality of likelihood factors, each related to a general cause of an optical defect, said plurality of causes comprising a glass batch raw material and portioning related cause, a glass furnace thermal condition related cause and a glass furnace refractory and foreign material related cause;

b. detecting the location and intensity of an optical defect in said ribbon of glass and responsive thereto generating a signal representing a defect probability factor for each of said plurality of causes;

c. comparing each detected process parameter value, as detected at a time when the glass wherein said optical defect is detected passed the point in said manufacture at which said process parameter value is detected, with its standard and responsive thereto generating signals representing its likelihood factors as established in (a);

d. iteratively combining each of said signals representing each defect probability factor with each signal representing the likelihood factor corresponding to it for each detected process parameter and thereby generating a signal representing the iterative product of said combining;

e. selecting the signal representing the iterative product of said combining which is most disportionate from said signal initially generated in (b);

f. comparing said most disportionate signal with a predetermined damping standard and generating a control signal responsive thereto;

g. adjusting in response to said control signal the servo loop having the most disportionate likelihood factor signal for said most disportionate iteratively combined defect probability factor signal exceeding said predetermined damping standard wherein the remaining servo loops are permitted to remain unadjusted responsive to said defect probability factor signal whereby said optical defects are substantially reduced.

2. The method according to claim 1 wherein said step of adjusting the servo loop comprises adjusting the standard for said servo loop to be adjusted.

3. In an apparatus for the manufacture of flat glass comprising means for portioning batch materials, means for mixing batch materials, means for charging said mixed batch materials to a glass furnace, a glass furnace comprising a melting zone and a refining zone, means for receiving molten glass from said glass furnace and for forming a continuous ribbon of flat glass therefrom, means for conveying said continuous ribbon of flat glass from said forming means and a plurality of servo loop control means associated with said apparatus for controlling it, each of said servo loop control means comprising process parameter detecting means for generating process parameter signals, controller means for comparing process parameter signals with standards and generating control signals responsive thereto and actuator means for acting upon said apparatus responsive to said control signals, said process parameters comprising at least two parameters including batch weight, batch ingredient weights, batch moisture, cullet ratio, glass melter temperature, molten glass level, glass refiner temperature and the like, the improvement comprising;

a. means for detecting optical defects in said continuous ribbon of glass and means responsive thereto for generating a signal representing a defect probability factor for each of a plurality of optical defect causes, said plurality of causes comprising a glass batch raw material and portioning related cause, a glass furnace thermal condition related cause and a glass furnace refractory and foreign material related cause;

b. means for comparing the signal of each of said process parameter detecting means with a predetermined standard and means responsive thereto for generating a signal representing a likelihood factor for each process parameter for each of said plurality of optical defect causes; said comparing means having means for delaying said comparison for each process parameter signal equal to the time of passage of glass from the location of said process parameter detecting means to the location of said optical defect detecting means;

c. means for generating a plurality of combined defect probability signals by iteratively combining signals representing all of said process parameter likelihood factors for each of said plurality of optical defect causes;

d. means for selecting the most disportionate combined defect probability signal;

e. means responsive to said most disportionate combined defect probability signal selecting means for adjusting said controller means of each of said servo loops having the largest likelihood factor signal for the largest combined defect probability signal.

4. The method according to claim 1 wherein there is the further step of detecting a variation of said detected optical defects with respect to time and in the step of adjusting a servo control loop said adjusted servo control loop is adjusted responsive to a detected variation of said detected optical defect intensity and location with respect to time.

5. The method according to claim 1 wherein likelihood factors are established prior to the detection of the values of the process parameters to which they correspond.

* * * * *